SUPERCONDUCTING MEMORY MARTRIX WITH DRIVE LINE READOUT

Filed Dec. 12, 1966 5 Sheets-Sheet 1

Inventors:
Vernon L. Newhouse,
Harold H. Edwards,
by Marvin Snyder
Their Attorney.

SUPERCONDUCTING MEMORY MARTRIX WITH DRIVE LINE READOUT

Filed Dec. 12, 1966 5 Sheets-Sheet 2

Inventors:
Vernon L. Newhouse,
Harold H. Edwards,
by Marvin Snyder
Their Attorney.

SUPERCONDUCTING MEMORY MARTRIX WITH DRIVE LINE READOUT

Filed Dec. 12, 1966 5 Sheets-Sheet 3

Inventors:
Vernon L. Newhouse,
Harold H. Edwards,
by Marvin Snyder
Their Attorney.

Inventors:
Vernon L. Newhouse,
Harold H. Edwards,
by Marvin Snyder
Their Attorney.

SUPERCONDUCTING MEMORY MARTRIX WITH DRIVE LINE READOUT

Filed Dec. 12, 1966 5 Sheets-Sheet 5

Inventors:
Vernon L. Newhouse,
Harold H. Edwards,
by Marvin Snyder
Their Attorney.

United States Patent Office 3,541,532

Patented Nov. 17, 1970

3,541,532

SUPERCONDUCTING MEMORY MATRIX WITH DRIVE LINE READOUT

Vernon L. Newhouse, Scotia, and Harold H. Edwards, Schenectady, N.Y., assignors to General Electric Company, a corporation of New York Continuation-in-part of application Ser. No. 523,755, Jan. 28, 1966. This application Dec. 12, 1966, Ser. No. 600,895

Int. Cl. G11c *7/00, 11/44;* G11b *9/04*

U.S. Cl. 340—173.1 15 Claims

ABSTRACT OF THE DISCLOSURE

Apparatus for achieving interrogation of a superconductive memory matrix and readout of stored data therefrom by sensing either persistent currents circulating within the matrix or output voltages produced by the matrix. Noise produced by input of data to the matrix is prevented from appearing in the output signal by briefly delaying interrogation until the noise has died away. Further noise minimization when voltages are sensed is achieved by gating the output signal to appear only at the desired instants of readout.

CROSS-REFERENCES TO RELATED APPLICATIONS

This is a continuation-in-part of application Ser. No. 523,755, filed Jan. 28, 1966, now abandoned.

BACKGROUND OF THE INVENTION

This invention relates to data storage and retrieval, and more particularly to circuits for retrieving data stored in a superconductive memory matrix by sensing either output voltages or persistent circulating currents therein.

Memory matrices employing the phenomenon of superconductivity, such as cryotron memory matrices, are well-known. Both the phenomenon and typical matrices are described in Part IV of Prywes, Amplifier and Memory Devices, McGraw-Hill, 1965. A cryotron memory matrix is also shown and described in our copending application, Ser. No. 419,330, filed Dec. 18, 1964, now Pat. No. 3,359,543, and assigned to the instant assignee. These cryotron memory matrices, which are particularly useful in data processing systems, have heretofore employed voltage sensing in retrieval of data from the matrix. Specifically, simple cryotron storage cells have been interrogated and sensed by extinguishing current stored therein and observing polarity of the resulting voltage pulse on the interrogated line. However, if such cryotron storage cells are miniaturized to the entire extent possible by use of modern techniques, the output voltage amplitude and duration have heretofore been considered too small to be detected by conventional sensing methods. This problem is overcome by the present invention, which concerns means for sensing data stored within memory matrices employing fully miniaturized cryotron storage cells without unnecessary circuit complexity. Matrix output data are provided either in the form of output voltages or persistent currents which facilitate noise-free detection since all electromagnetic interference associated with interrogating signals can be allowed to die away prior to sensing.

SUMMARY OF THE INVENTION

One object of the invention is to provide means for sensing output signals of a superconductive memory matrix after all electromagnetic interference associated with the interrogating signals has died away.

Another object is to provide means for sensing output signals of a superconductive memory matrix by inducing a persistent current in a superconducting detection circuit.

Another object is to provide means for utilizing the drive lines of a superconductive memory matrix to also sense matrix output data.

Briefly, in accordance with a preferred embodiment of the invention, there is provided a data storage system comprising a matrix of superconductive memory cells arranged in rows and columns. Each cell includes a gate conductor, a control conductor, and means for maintaining a persistent circulating current in the cell. Circuit means are provided for connecting the control conductors in each of the respective rows of cells in series and the gate conductors in each of the respective columns of cells in series. Switching means are coupled to each of the rows of control conductors and columns of gate conductors respectively, for selectively energizing individual ones of these rows and columns, respectively. Cryogenic amplifier means are provided, along with gating means selectively connecting the amplifier means to at least one of the columns of gate conductors so as to form a superconductive circuit therewith.

In accordance with another preferred embodiment of the invention, there is provided a data storage system comprising a matrix of superconductive memory cells arranged in rows and columns. Each cell includes a gate conductor and a control conductor. Circuit means are provided for connecting the control conductors in each of the respective rows of cells in series and the gate conductors in each of the respective columns of cells in series. Switching means are coupled to each of the rows of control conductors and columns of gate conductors respectively, for selectively energizing individual ones of these rows and columns, respectively. Amplifier means are provided, along with gating means selectively connecting the amplifier means to at least one of the columns of gate conductors so as to form a readout circuit therewith.

BRIEF DESCRIPTION OF THE DRAWINGS

The features of the invention believed to be novel are set forth particularly in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENTS

Figures 1, 2:
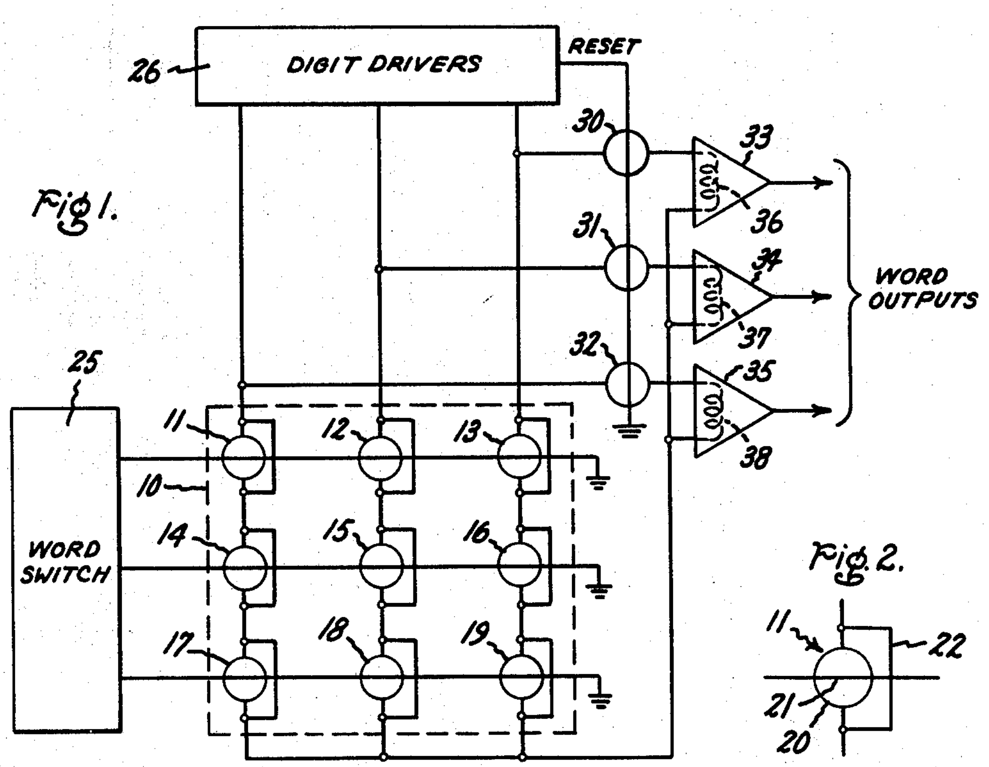
FIG. 1 is a schematic diagram of the superconductive matrix in a word-organized memory employing the current sensing readout circuitry of the instant invention.
FIG. 2 is a symbol used in the drawings to represent the superconductive memory cell illustrated in FIGS. 5 and 6.

In FIG. 1, a matrix 10 comprising cryotron cells 11–19 is shown. The matrix is illustrated as a 3 x 3 array only for simplicity in explaining principles of operation. Typical arrays, however, are usually much larger than 3 x 3, as will be appreciated by those skilled in the art.

Each of the cells of matrix 10, such as cell 11 which is schematically illustrated in FIG. 2, comprises a gate conductor 20 and a control conductor 21. The gate conductor is rendered resistive or nonresistive in response to a magnetic field produced by current in the control conductor. In addition, a conductor 22 is connected in shunt with gate conductor 20. The inductance of conductor 22 is considerably greater than that of gate conductor 20.

In FIG. 1, word switch circuitry 25 is connected to drive matrix rows comprising series-connected control conductors of cryotron cells 11, 12 and 13, cells 14, 15 and 16, and cells 17, 18 and 19. Similarly, digit driver circuits 26 are connected to drive matrix columns comprising series-connected gate conductors of cryatron cells 11, 14 and 17, cells 12, 15 and 18, and cells 13, 16 and 19, while each of the columns is connected to the superconducting input of cryogenic amplifiers 33, 34 and 35, respectively, through the gate conductor of each of cryotron cells 30, 31 and 32, respectively. The input impedance of each of the cryogenic amplifiers is purely inductive, as indicated schematically by impedances 36, 37 and 38, respectively. The cryogenic amplifier output signals comprise the word outputs of matrix 10. The control conductors of cryotrons 30, 31 and 32 are connected in series and reset by circuitry which may conveniently be incorporated in digit drivers circuitry 26.

For proper operation, matrix 10 in its entirety, along with cells 30–32 and amplifiers 33–35, must be maintained at cryogenic temperatures, so as to utilize the superconductive characteristics of the circuitry involved. Thus, data in binary form are supplied to matrix 10 by selective energization of a single column of cells, such as cells 11, 14 and 17. Under these conditions, a write current is supplied by digit drivers 26 to each of the series-connected, superconducting gates of cells 11, 14 and 17. In absence of output signals from word switch 25, current flows through the gates rather than the conductors connected in shunt therewith, which are also superconducting, due to the greater inductance and hence reactance of the shunt conductors. In the system illustrated in FIG. 1, the currents furnished by digit drivers 26 and word switches 25 are assumed to be uni-directional. However, bi-directional currents may alternatively be used to provide information storage and readout, if desired. In such case, the direction of current from digit drivers 26 would determine whether the circulating current established in the storage cells is clockwise or counterclockwise, and polarity of output current therefrom would be sensed by amplifiers 33–35 to produce a binary ONE or ZERO output indication.

Depending upon the energized condition of the output conductors of word switch 25 at the time current is furnished to a column by digit drivers 26, either a binary ONE or a binary ZERO is stored in each of the cryotron memory cells of the column. This is due to the well-known fact that a sufficiently intense magnetic field, which may be established within a cryotron memory cell by current flow through the superconducting control conductor, renders the gate conductor resistive. Therefore, in any of the memory cells, substantially all the current from digit drivers 26 flows through the nonresistive gate conductor if the control conductor current is below a critical value required to render the gate conductor resistive; however, substantially all the current flows instead through the shunt conductor whenever the control conductor current exceeds the critical value. When current flow through the control conductor ceases, the gate conductor returns to its nonresistive condition. Since the shunt conductor has zero resistance, current through it remains unchanged even though the gate conductor has reverted to its zero resistance state. However, immediately after the control conductor current ceases, the gate conductor energizing circuit is opened by digit drivers 26, thereby establishing, for reasons which are set forth in detail in section 30.2 of Applied Superconductivity, by V. L. Newhouse, John Wiley and Sons, 1964, a persistent circulating current through the loop comprising the gate and shunt conductors. This condition may represent that of a stored ONE. However, if no current is supplied by digit drivers 26 while the control conductor carries current in excess of the critical value, any persistent current which may have previously been circulating within the loop comprising the gate and shunt conductors is destroyed by the gate resistance; moreover, upon cessation of the control current, no new current is established within the loop. This condition may represent that of a stored ZERO. In this fashion, information is selectively "written into," or supplied to, the memory matrix.

During the "writing" process, current in excess of the critical value is supplied to the control conductors of cryotron cells 30, 31 and 32 from digit driver circuitry 26, in order to preclude digit driver current from passing to the inputs of amplifiers 33, 34 and 35. However, after information has been "written into" the matrix, current flow through the control conductors of cryotron cells 30, 31 and 32 ceases. Readout is then accomplished by energizing the control conductors of any selected row of cryotron memory cells in the matrix with current in excess of the critical value. For example, assume that readout is desired from the uppermost row of cryotron cells in the matrix; that is, cryotron memory cells 11, 12 and 13. Moreover, assume a persistent circulating current flows within memory cell 11, while no circulating current flows within cryotron memory cells 12 and 13. This condition may be defined to indicate that cell 11 contains a stored ONE, while cells 12 and 13 contain stored ZEROS. Hence, upon passage of an interrogating current through the uppermost row of control conductors within matrix 10 from word switch 25, the circulating current within cryotron memory cell 11 is converted into a voltage drop across the now-resistive gate conductor of the cell. This voltage drop induces current flow through the superconducting gate of cryotron 32 to the inductive input circuitry 38 of cryogenic amplifier 35 from ground through the nonresistive gate conductors of cryotron memory cells 17 and 14 and the shunt conductor of cryotron memory cell 11. This induced current continues to flow even after the control conductors in the cryotron memory cells of the uppermost row in matrix 10 are de-energized. Therefore, at any subsequent time, amplifier 35 provides an output ONE indication. On the other hand, amplifiers 33 and 34 provide output ZERO indications since no persistent current existed within memory cells 13 and 12, respectively, when the gate conductors of the respective memory cells were rendered resistive; thus, no voltage-induced current was established through the respective shunt conductors of cells 12 and 13. The ONE ZERO ZERO condition of amplifiers 35, 34 and 33, respectively, is maintained until the next "write" signals are provided by digit drivers 26, at which time a reset current is passed through the control conductors of cryotrons 30, 31 and 32, halting flow of current therethrough by virtue of the resulting resistive condition of the gate conductors therein. At this time, persistent currents circulating through the columns of the matrix cease.

It should be noted that currents circulating within uninterrogated cryotron memory cells of the matrix continue to flow indefinitely. However, this condition does not interfere with proper operation of the matrix since, at the time new information is written into a cryotron memory cell, word switch 25 renders the cryotron memory cell gate conductor resistive, destroying the persistent current. Specifically, if a new ZERO is to be written into any of the cryotron memory cells, only the control conductor thereof is energized with current in excess of the critical value; hence, whether or not a persistent current had previously been flowing in the shunt conductor thereof, no current flows through the shunt conductor by the time the control conductor is de-energized. The resistive condition of the gate conductor, during the time in which the control conductor is energized, extinguishes any such persistent current flowing through the shunt conductor. Yet, if a ONE is stored within the cryotron memory cell at the time a ONE is to be re-established therein, simultaneous energization of the memory cell control and gate conductors re-establishes a persistent current therein, in a manner similar to that already described. This condition, moreover, is independent of whether or not a persistent current has already been flowing in the shunt conductor.

Figure 3:
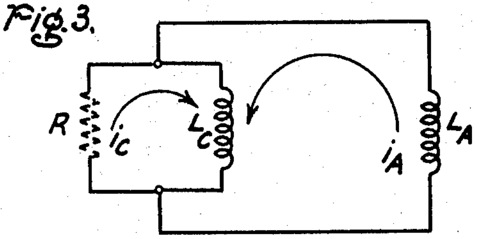
FIG. 3 is an equivalent circuit for illustrating operation of the superconductive memory cell employed in the instant invention.

The equivalent circuit of FIG. 3 schematically illustrates operation of the cryotron memory cells in matrix 10 of FIG. 1. Thus letting $L_A$ represent the input inductance of amplifier 35, R represent the gate resistance of crytron memory cell 11 when the gate is driven to its normal or resistive condition due to the magnetic field created by current in the control conductor, and $L_C$ represent the inductance introduced by the shunt conductor of cryotron memory cell 11, storage of a ONE within cryotron memory cell 11 involves a constant circulating current $i_C$ within the circuit comprising the gate and shunt conductors in cryotron memory cell 11. When the gate becomes resistive, the voltage created by flow of current $i_C$ through resistance R induces a current $i_A$ which flows through inductances $L_A$ and $L_C$ as a function of time *t*. It can be shown that $$i_A=\frac{L_C}{L_A+L_C}i_C(1-e^{-t/T})$$

where $$T=\frac{\frac{L_C}{R}}{1+\frac{L_C}{L_A}}$$

and *e* is the base of natural logarithms. For *t* much larger than T, the expression for current $i_A$ reduces to $$i_A=\frac{L_C}{L_A+L_C}i_C$$

Therefore, since the sensed current eventually reaches a sustained constant value, the cell output signal can be said to be "stretched" in time.

The foregoing analysis neglects additional inductance appearing in the matrix column of the circuit. Designating this additional inductance $L_D$, the circuit of FIG. 3 is modified in the manner shown in FIG. 4. For *t* much larger than T, current $i_A$ may now be expressed as $$i_A=\frac{L_C}{L_D+L_A+L_C}i_C$$

To estimate the magnitude of sensed current in a typical case, assume that 1000 cryotron memory cells are present in each matrix column. Assuming a cell inductance of eight nanohenries, an interconnection inductance of two nanohenries per cell in each matrix column, and amplifier inductance (including amplifier interconnections) equal to the matrix column inductance, or 2000 nanohenries, then, if the current $i_C$ stored within the cell is 100 milliamperes, the persistent amplifier input current is $$i_A=\frac{8}{2000+8+2000}(100\text{ ma.})=0.2\text{ milliamps}$$

This can readily be detected by use of a cryogenic amplifier of several megacycles bandwidth.

The value of this so-called "current stretching" becomes evident when, assuming typical operating parameters, it is realized that a circulating current $i_C$ of 100 milliamps produces a voltage drop, when the gate is rendered resistive, having a peak value of about 150 microvolts. Yet, to achieve even this low output voltage, the rise time of the word switch current pulse for interrogating any selected matrix row must be much less than the time-constant of the storage cells. Since the time-constant of a typical cell is on the order of 5 nanoseconds, conventional reading of such cell by voltage sensing across the matrix column would require that interrogation be performed by a word switch pulse having a rise time of less than 5 nanoseconds. The output signal would thus comprise a voltage pulse having a peak value of 150 microvolts and a decay time-constant of 5 nanoseconds. Such voltage is far too small and of too short duration to be sensed by conventional ungated voltage sensing methods.

When this circuit is employed in sensing stored data, spurious signals induced in the digit lines, or column conductors, due to sharp-edged current pulses on the word lines, or row conductors, do not contribute to the sensed current. This is because disturbing signals of this type are due to capacitive or electromagnetic coupling, or both, between word and digit lines. If such matrix line undergoes a voltage or current excursion which begins and ends at the same current or voltage value, it can be shown that any other line, capacitively or inductively coupled thereto, will experience a voltage excursion having a time integral of zero; that is, because this form of current sensing involves time integration, all such induced signals cancel out to zero. This feature provides considerable advantage over ordinary superconducting memory matrices wherein word line pulses having nanosecond rise and fall times produce spurious signals which obliterate desired output signals, unless elaborate compensating circuitry is provided.

Figure 5:
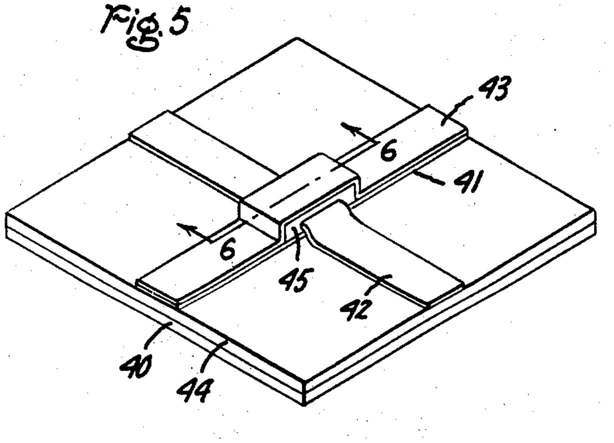
FIG. 5 is an isometric view of a superconductive memory cell for use in the matrix of FIG. 1.

FIG. 5 illustrates one type of bridge cell which may be utilized in the matrix of FIG. 1. The cell comprises a ground plane 40 of lead coated with a thin layer of electrical insulation 44, such as silicon oxide. A tin gate 41 is mounted on layer 44, while a control 42 comprised of lead crosses tin gate 41 at right angles thereto. Affixed to either end of tin gate 41 is a lead strip 43 crossing control 42 at right angles thereto. Control 42 is electrically insulated from gate 41 and strip 43 by suitable insulation 45, such as silicon oxide. Strip 43 comprises conductor 22, connected in shunt with the gate of cryotron storage cell 11, as shown in FIG. 2.

Figure 6:
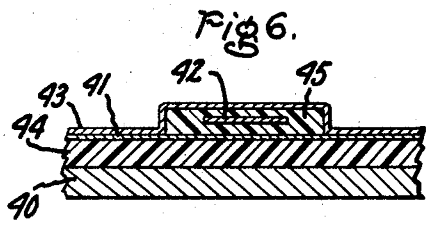
FIG. 6 is a sectional view of the superconductive memory cell of FIG. 5.

FIG. 6 is a sectional view of the superconductive memory cell of FIG. 5 taken along line 6—6'. This view illustrates the relationship of control conductor 42 to lead strip 43 superimposed on tin gate 41. It can be seen that control conductor 42 is electrically insulated by insulation 45 from strip 43 and gate 41. Further detail regarding construction and operation of this type of cell may be obtained from paper 9.1 by R. W. Ahrons, entitled The Bridge Cell—A New Superconductive Memory Cell for Random-Access Word-Organized Memories appearing in the 1965 Proceedings of the Intermag Conference, April 1965.

Figures 7, 8:
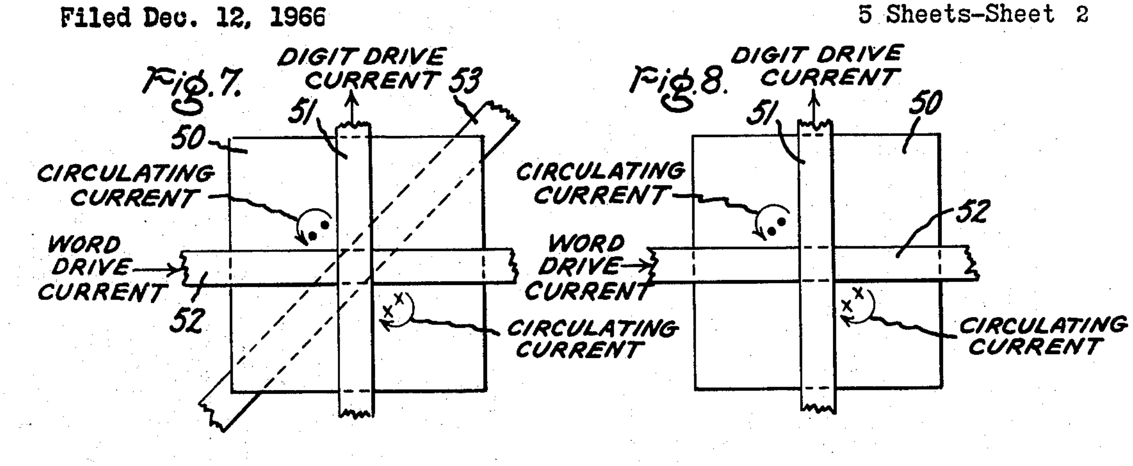
FIG. 7 is a top view illustration of a well-known continuous film memory cell.
FIG. 8 is a top view illustration of a simplified version of the continuous film memory cell of FIG. 7, which may be used in the instant invention.

A memory matrix utilizing the "current stretch" principle of detection may also be realized with a continuous film memory cell, hereinafter designated CFM cell. A top view of one well-known type of CFM cell is illustrated in FIG. 7. This cell comprises orthogonal, insulated, digit and word selection conductors 51 and 52, respectively, overlaid on a ground plane or superconductive film, such as a tin film 50. Affixed to the underside of the tin film directly beneath the crossover of drive conductors 51 and 52 is an insulated sense conductor 53, directed so as to substantially bisect the angle between drive conductors 51 and 52. Conductors 51 and 52, as well as sense conductor 53, are comprised of lead. An insulated tin ground plane (not shown) may be placed underneath the sense conductor to magnetically shield the sense conductor.

The crossover of conductors 51 and 52 defines a storage location. When current pulses are passed through these conductors in the directions indicated, lines of magnetic flux indicated by dots and crosses to designate magnetic fields directed upward from, or downward into, the plane of tin film 50 respectively, can be made to penetrate the tin film in the crossover vicinity, link the sense line, and store a ONE in the film. The opposite information, representing a ZERO, can be stored by inverting the direction of both the digit and word currents so as to reverse the direction of magnetic flux penetrating tin film 50. However, the flux pattern in film 50 is temporarily only slightly disturbed, subsequently reverting to its previous condition after only a word current or digit current has been present alone.

The areas of the tin film in the vicinity of the crossover in a fully-selected cell switch from the superconducting to a normal state in response to the magnetic field established by the conjoint energization of drive lines 51 and 52, which penetrates the film. This induces circulating currents within the film, directed as shown in FIG. 7. When the digit and word currents cease, the magnetic fields creating the circulating currents collapse; however, because the film switches back to its superconducting state when the digit and word currents cease, the circulating currents persist within the superconducting film.

The word and digit drive lines are both pulsed with currents in the ZERO direction to interrogate the cell. Thus, if a ZERO is stored, the magnetic flux linking the sense line remains undisturbed, so that no output pulse is obtained; however, when a ONE has been stored, the magnetic flux linking the sense line is thereby reversed, producing an output voltage on the sense line. Further detail regarding construction and operation of a CFM cell, such as shown in FIG. 7, may be obtained by reference to an article by L. L. Burns, Jr. et al., entitled Coincident-Current Superconductive Memory, appearing in IRE Transactions on Electronic Computers, volume EC-10, No. 3, pages 438–446, September 1961.

Figure 4:
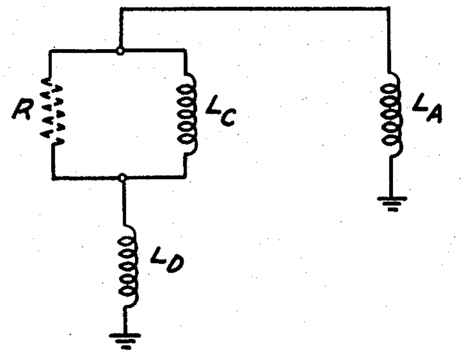
FIG. 4 is an equivalent circuit to aid in describing readout data from the columns of the superconductive memory matrix employed in the instant invention.

FIG. 8 illustrates a modification of the CFM cell of FIG. 7, wherein no sense conductor is required. In analyzing operation of this cell in accordance with the equivalent circuit of FIG. 4, $L_C$ represents inductance of the digit line portion of the storage cell during magnetic flux switching of the cell. Since storage plane 50 is not superconducting during this magnetic flux switching, $L_C$ is equal to the normal inductance of a portion of digit drive line 51 of length approximately equal to its width. $L_D$ in FIG. 4 represents inductance of the rest of the digit drive line, while $L_A$ represents the input inductance of the cryogenic sense amplifier.

During sensing, most of the digit drive line is situated above a superconducting ground plane, since sufficient magnetic flux to drive the ground plane into its normal state is produced only at the fully selected cell. The ratio of sensed current to stored current is $$\frac{i_A}{i_C}=\frac{L_C}{L_D+L_A+L_C}$$

as previously shown, $L_D$ being designated to contain inductances of all of the half-selected cells on any one of the energized digit drive lines. Assuming each digit drive line crosses $n$ cells then $$\frac{i_A}{i_C}=\frac{L_N}{nL_S+L_A+L_N}$$

where $L_N$ is the contribution to digit line inductance made by a switched cell, and $L_s$ is the contribution made by the remaining, or half-selected, cells of the energized digit drive line.

For a cryotron cell memory deposited above a permanently superconducting ground plane, such as shown in FIGS. 5 and 6, $L_N \sim L_S = L_C$. Hence, if $n=1000$ and $nL_C$ is much larger than $L_A$.

$$\frac{i_A}{i_C}\sim\frac{L_C}{nL_C+L_A+L_C}\sim\frac{1}{n}=\frac{1}{1000}$$

For a CFM on the other hand, $$\frac{L_N}{L_S}\sim 100$$

and assuming that $nL_S$ is much larger than $L_A$, then $$\frac{i_A}{i_C}=\frac{L_N}{nL_S+L_A+L_N}\sim\frac{L_N}{nL_S}=\frac{100}{n}=\frac{1}{10}$$

Therefore, the nonlinear inductance of the CFM imposes considerably lower gain requirements on the sense amplifier than does the linear cell inductance of cryotron-type cells.

If the cryogenic sense amplifier is connected across the digit current drive line of a matrix of CFM cells, such as shown in FIG. 8, in a manner similar to that illustrated for cryotron matrix 10 of FIG. 1, part of the digit drive current may be diverted through the cryogenic sense amplifier and appear as a false memory output signal. This problem is readily overcome by use of a sense line reset cryotron, such as illustrated in FIG. 1.

Use of a CFM memory plane raises the possibility that an isolated region of the plane associated with only the digit drive line might switch a small amount of magnetic flux each time the digit line is pulsed. This condition could be due to presence of sharp corners in the digit drive line. Moreover, any nonuniformity in memory plane characteristics might result in a small amount of magnetic flux switching at a location other than the storage crossover. If the digit drive line were to cross a thousand cells, for example, there might be enough of these small flux switching regions to produce an appreciable output signal. This problem may readily be overcome by turning on the digit current before the word current and using the reset cryotron to extinguish the sense currents produced by spurious digit drive line flux switching. Once this has been accomplished, the gate conductor of the reset cryotron is made superconducting, and the word drive line is pulsed. This produces flux switching of the cell situated at the crossover of the activated digit and word lines, which can be sensed by the sense amplifier. The digit and word currents are then turned off, and the gate of the reset cryotron is again made resistive to extinguish the sense amplifier input current. Hence, in CFM memories, use of "current stretch" sensing represents a way of making possible the complete elimination of contributions otherwise made to the sense signal by spurious flux switching in half-selected cells. This is not the case in conventional sensing using a zig-zag line including sense conductor 53 of the CFM cells such as shown in FIG. 7, since here the build-up of spurious signals from half-selected cells becomes a formidable problem for large memories.

Figure 9:
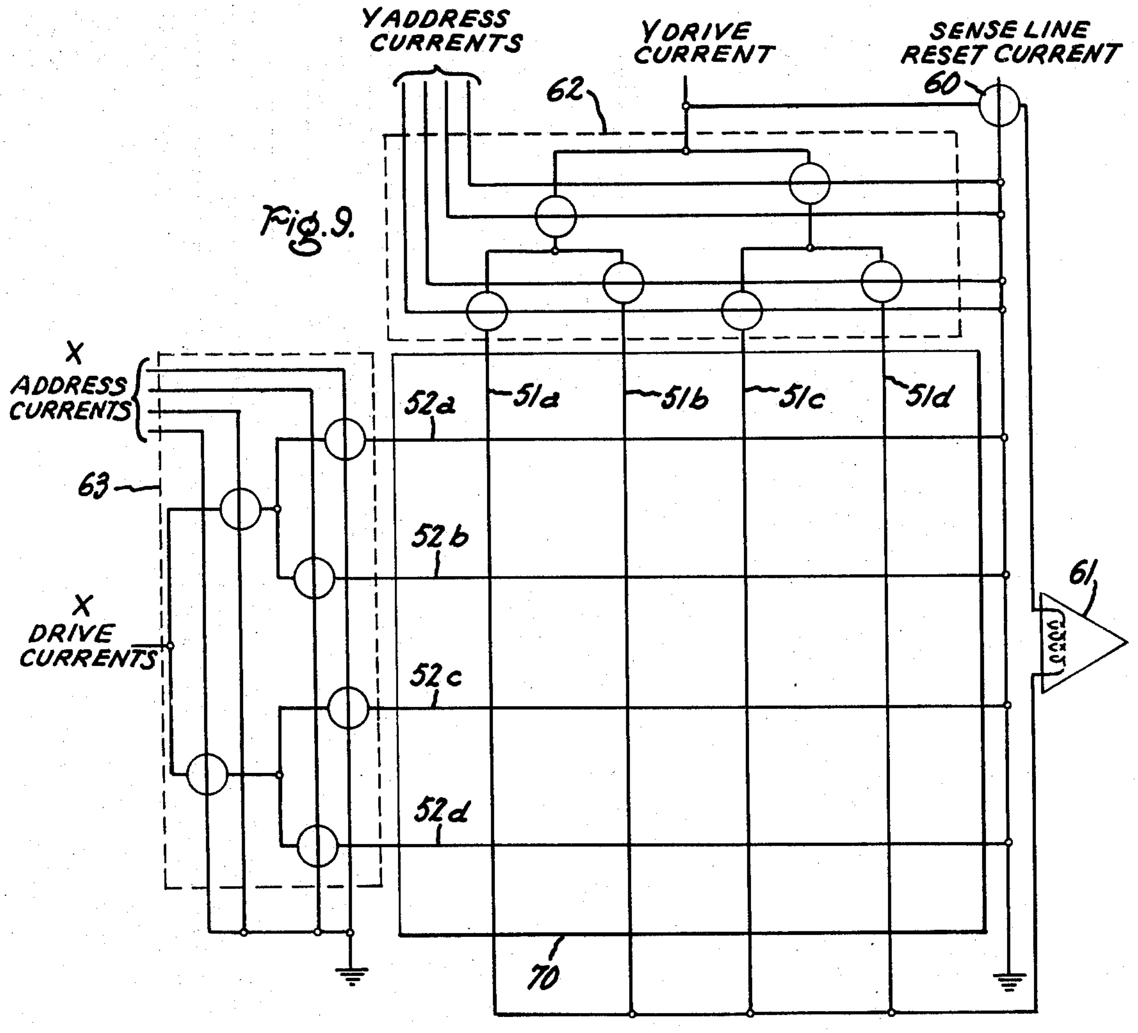
FIG. 9 is a schematic diagram of a bit-organized memory employing the current sensing readout circuitry of the instant invention.

FIG. 9 illustrates a memory matrix 70 of CFM cells, such as shown in FIG. 8, connected in a bit-organized memory configuration. In this system, each cell represents a crossover of X or row lines 52$a$–52$d$ and Y or column lines 51$a$–51$d$, with the Y lines used for sensing. Insertion of information into the matrix occurs in a manner similar to that described for the matrix in the system of FIG. 1. To thereafter interrogate any particular cell, current is first passed through the associated Y line from a cryotron tree 62, with the gate conductor of a sense line reset cryotron 60 held resistive by passage of sufficient control current therethrough. Thus, shunt current is prevented from passing through reset cryotron 60 to a cryogenic sense amplifier 61 having a superconducting input and hence a purely inductive input impedance. Subsequently, control current through reset cryotron 60 ceases, so that the gate conductor thereof again becomes superconducting. At this time, current is passed through the selected X line from a cryotron tree 63. This produces a voltage across the digit conductor of the fully-selected cell of matrix 70, assuming a ONE is stored therein, inducing a persistent current through the superconducting path comprising the selected Y line, cryotron tree 62, sense line reset cryotron 60, and sense amplifier 61. Sense line reset cryotron 60 may be used to extinguish the sensed current when desired. In the event a ZERO is stored in the fully-selected cell, however, no persistent current is induced through the latter superconducting path.

It is noted that operation of both the X and Y line cryotron trees is similar; that is, selective removal of address currents supplied to control conductors of the cryotrans within either cryotron tree establishes conducting paths through the gate conductors of the selected cryotrons which determine what rows or columns of the matrix, as the case may be, are to receive drive current. For proper operation, the address currents must be applied to the cryotron tree prior to the drive current, so as to assure proper direction of the drive current into the matrix. Additional detail in regard to operation of cryotron trees may be obtained from J. W. Bremer et al., U.S. Pat. No. 3,167,748, issued Jan. 26, 1965 and assigned to the instant assignee.

Figure 10:
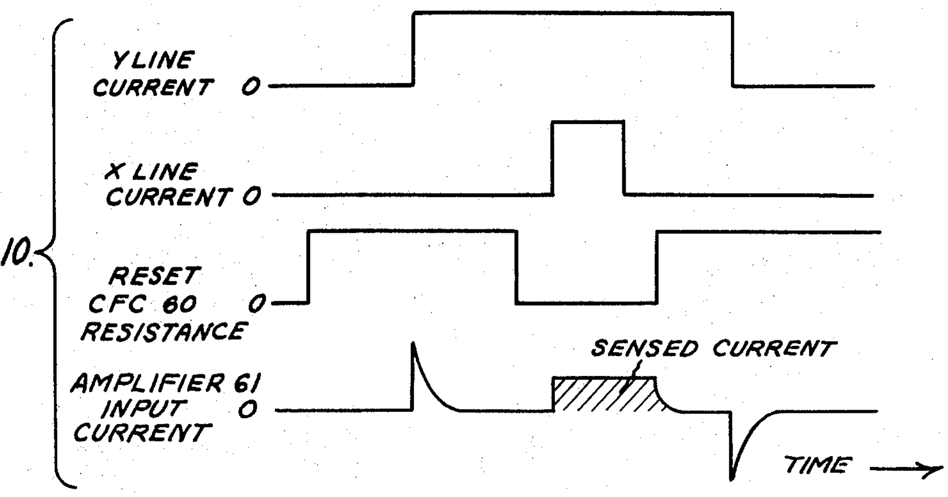
FIGS. 10 and 11 illsutrate waveforms representing operation of the circuit of FIG. 9.

Spurious flux switching of the CFM memory matrix of FIG. 9 may be overcome by a somewhat conventional technique, so as to eliminate the effects of spurious Y line flux switching. This technique is illustrated by the waveforms of FIG. 10. Here, the selected Y line drive current is turned on prior to the selected X line drive current, and reset cryotron 60 quenches the input current to amplifier 61 poduced by spurious Y line flux switching. The gate conductor of reset cryotron 60 is thereafter rendered nonresistive (made superconducting), and current is applied to the selected X line. This produces flux switching of the cell situated at the crossover of the activated Y and X lines, which can be sensed by amplifier 61 through the superconducting reset cryotron. Thereafter, the Y line and X line currents are turned off, and the reset cryotron is returned to its normal condition to quench the input current to amplifier 61.

Figure 11:
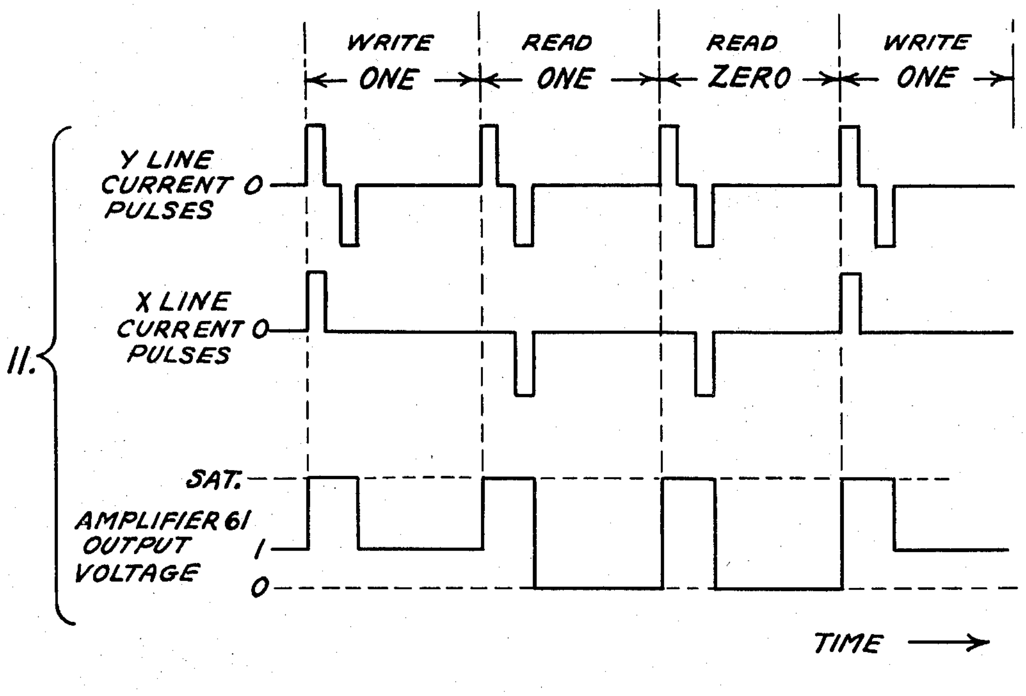

Spurious flux switching of the CFM may also be avoided by utilizing the pulse patterns of FIG. 11, which additionally enables substitution of a simple superconductor for sense line reset cryotron 60 by obviating necessity of opening the circuit to amplifier 61 during application of Y line drive current. Thus, a positive current pulse followed by a negative current pulse is applied to the selected Y line whenever it is desired to write into or interrogate the memory. Specifying that coincident X and Y line positive current pulses write a binary ONE into the memory and coincident X and Y line negative current pulses either interrogate the memory or write a binary ZERO into the memory, the pattern of FIG. 11 depicts four inputs to a selected CFM cell, designated, in successive order: write ONE (however, since the cell already has a ONE stored, no flux switches in the cell); read ONE (net flux is switched in the cell); read ZERO (no net flux in the cell is switched); and write ONE (net flux is switched in the cell). Although amplifier 61 saturates due to current diverted thereto by the Y line positive pulse, as a result of flux switching associated with the Y line alone, the Y line negative pulse causes an equal and opposite amount of flux to be switched, thereby returning amplifier 61 to its original condition. Hence, unless the X line pulse has caused a net flux change at the selected CFM cell, amplifier 61 returns to its original condition after the Y line negative pulse is terminated. This condition is reflected by the quiescent output voltage level of amplifier 61, which is at a value of either 1, representing presence of a stored binary ONE, or a lower value 0, representing presence of a stored binary ZERO.

Voltage sensing represents another form of readout adaptable to use with a continuous film matrix comprising two-conductor cells of the type shown in FIG. 8. This is illustrated schematically in FIG. 12 wherein CFM memory matrix 70 is connected in a word-organized memory configuration, and data are read out by sensing voltages across column lines 51*a*–51*d* through respective gated voltage amplifiers 73–76. In order to minimize noise, each of the signal-carrying leads is shielded, and is therefore represented by coaxial cable. The X rows 52*a*–52*d* are energized from a word switch 77, while the Y columns 51*a*–51*d* are energized from digit drivers circuitry 78. Word switch 77 and digit drivers 78 are similar to word switch 25 and digit drivers 26 respectively, shown in FIG. 1.

Figure 12:
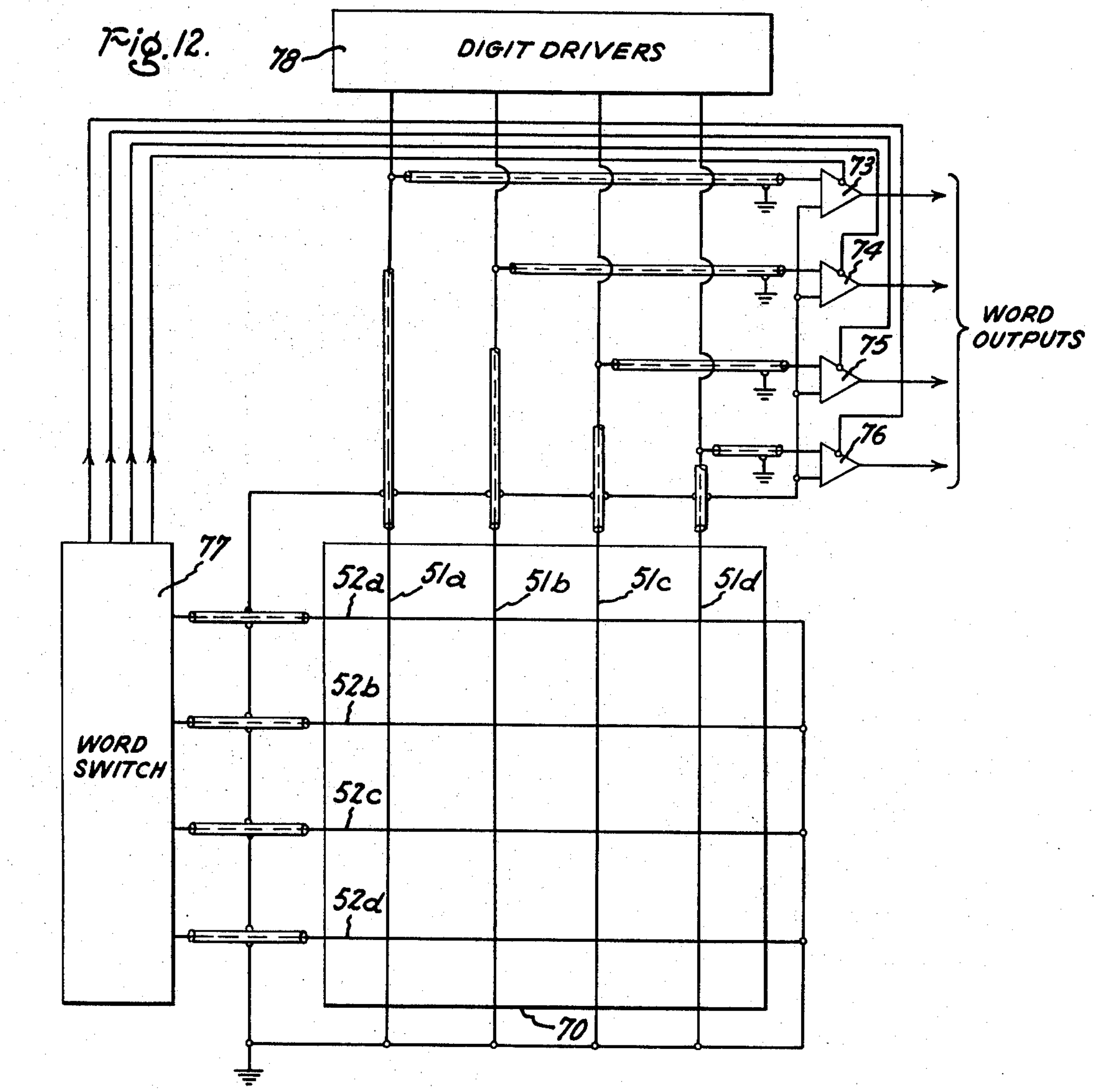
FIG. 12 is a schematic diagram of the superconductive matrix in a word-organized memory employing the voltage sensing readout circuitry of the instant invention.

Operation of the apparatus of FIG. 12 is similar to that described for the apparatus of FIG. 9. Thus, information is supplied to the matrix in a manner similar to that described for the matrices of FIGS. 1 and 9. To thereafter interrogate any particular cell of the matrix, current is first passed through the associated Y line from digit drivers 78 long enough before the X current from word switch 77, as shown in FIG. 13, so that any noise produced in the gated sense amplifier associated with the activated Y line by current passing through the Y line has sufficient time to die away.

Figure 13:
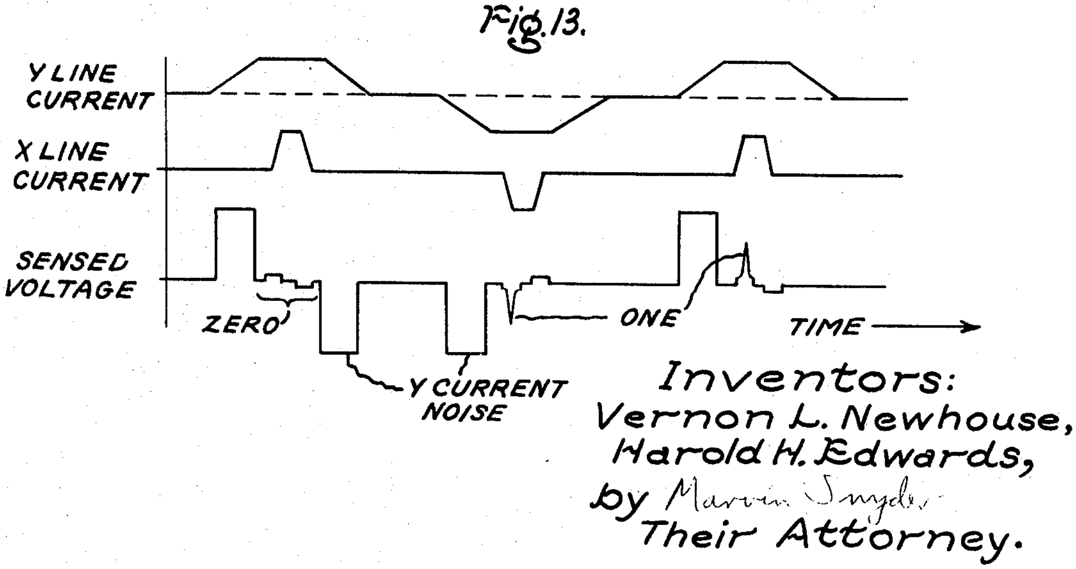
FIG. 13 illustrates waveforms representing operation of the circuit of FIG. 12.

FIG. 13 illustrates the relationship between the X and Y line currents, together with the sensed voltage, along a common time abscissa. By utilizing a slowly rising Y current pulse, as shown in FIG. 13, the amplitude of the noise signal in the sense amplifier is minimized. Thus, when the X current pulse is initiated, any flux penetration through the matrix storage plane produces a voltage signal on the Y line which is sensed by the associated gated sense amplifier. In FIG. 13, the sensed ZERO signal is shown as being of very small amplitude, indicating that no flux has penetrated the storage plane. The very low amplitude voltage fluctuations, which are insufficient to produce any adverse effect on output data, are those calculated to occur due to stray inductive coupling between the X and Y lines.

When application of the X current pulse does produce flux switching of any particular cell, a voltage pulse representing a ONE is developed on the associated Y line. By gating sense amplifiers 73–76 in accordance with X line current, the amplifiers can respond only to flux which is switched by the combined action of an X and Y line; that is, flux which links the X–Y crossover diagonally. During intervals in which no X line current is supplied by word switch 77, amplifiers 73–76 are gated off, preventing false output pulses from being supplied to utilization means (not shown) through the voltage sensing amplifiers.

Figure 14:
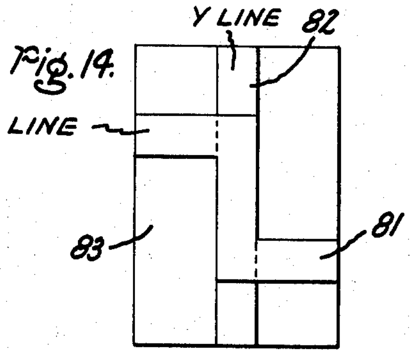
FIG. 14 is a schematic illustration of an inline cell which may be used in the matrix of FIG. 12.

The voltage sensing method described in conjunction with the apparatus of FIG. 12 is also applicable to a memory matrix comprised of inline cells, such as shown in Feissel Pat. No. 3,264,617, issued Aug. 2, 1966. In a memory matrix comprised of inline cells, each storage cell is formed, in the manner illustrated in FIG. 14, from a short parallel section of X and Y lines 81 and 82 respectively. The X and Y lines are comprised of a high critical field superconductor, such as lead, and overlay a sheet of low critical field superconductor 83 such as tin. The matrix is formed in the manner exemplified schematically by matrix 70 of FIG. 9.

Figure 15:
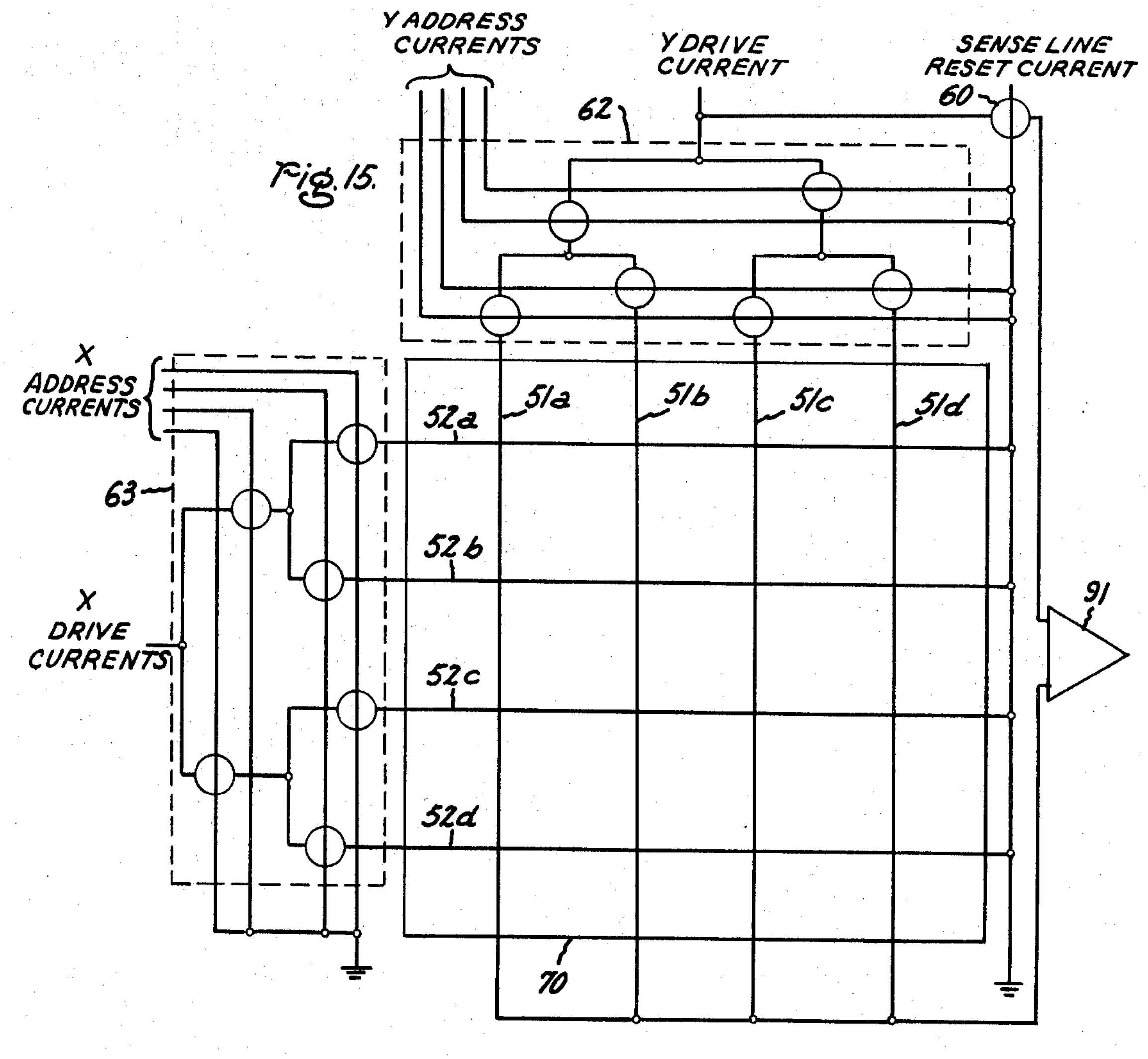
FIG. 15 is a schematic diagram of a bit-organized memory employing the noncryogenic voltage readout circuit of the instant invention.

The voltage sensing method is also applicable to a bit-organized memory. This is shown in FIG. 15 which illustrates a noncryogenic voltage sensing amplifier 91 which is substituted for cryogenic current sensing amplifier 61 in the circuit shown in FIG. 9. By use of amplifier 91, it is possible to sense output voltage across any of the Y drive lines selected by the Y address currents applied to cryotron tree 62. Moreover, operation of the apparatus in FIG. 15 is similar to that of the apparatus of FIG. 9. Thus, insertion of information into the matrix occurs in a manner similar to that described for the matrix in the system of FIG. 1. To thereafter interrogate any particular cell, current is first passed through the associated Y line from cryotron tree 62, with the gate conductor of sense line reset cryotron 60 held resistive by passage of sufficient control current through the control conductor thereof. Thus, voltage is prevented from reaching high input impedance amplifier 91 through reset cryotron 60. Subsequently, control current through reset cryotron 60 ceases, so that the gate conductor thereof again becomes superconducting. At this time, current is passed through the selected X line from cryotron tree 63. This produces a voltage across the digit conductor of the fully-selected cell of matrix 70, assuming a ONE is stored therein, which is sensed by amplifier 91 across a path comprising the selected Y line, cryotron tree 62 and sense line reset cryotron 60, in series. After this voltage is sensed, the gate conductor of cryotron 60 is returned to its resistive condition. In the event a ZERO had been stored in the fully selected cell, however, no voltage would have been sensed by amplifier 91 across the latter series circuit.

Spurious output voltages from the CFM memory matrix of FIG. 15 may be overcome by a technique somewhat similar to that used with the apparatus of FIG. 9, which eliminates effects of spurious Y line flux switching. Thus, the selected Y line drive current is applied to matrix 70 prior to the selected X line drive current, and reset cryotron 60 prevents the voltage caused by spurious Y line flux switching from reaching amplifier 91. The gate conductor of reset cryotron 60 is thereafter rendered nonresistive (made super-conducting), and current is applied to the selected X line. This produces flux switching of the cell situated at the crossover of the activated Y and X lines and the voltage pulse resulting from this flux switching is sensed by amplifier 91 through the superconducting gate conductor of reset cryotron 60. Thereafter, the sense line reset current is turned off, returning the gate conductor of reset cryotron 60 to its normal condition and thus rendering amplifier 91 nonresponsive to output voltages from the remainder of the apparatus. This is followed by cessation of the X line and Y line drive currents.

The foregoing describes means for sensing output signals of a superconductive memory matrix after all electro-magnetic interference associated with the interrogating signals has died away. By utilizing the matrix drive lines in order to sense matrix output data, alignment of the storage cells is greatly simplified. This is because only two lines must intersect at each cell, instead of three. Moreover, by use of CFM memories, smaller gain requirements are imposed upon the cryogenic sensing amplifier means.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

We claim:

1. A data storage system comprising: a matrix of superconductive memory cells arranged in rows and columns, each cell including a gate conductor, an unbypassed control conductor directed substantially normal to said gate conductor, and means coupled to said gate conductor at least at either end thereof for maintaining a persistent circulating current in said each cell; means connecting each of the control conductors in each of the respective rows of cells in series; means directly connecting the gate conductor of the adjacent cell in said each column; cryogenic amplifier means continuously permitting current passage therethrough, said amplifier means being connected to one end of at least one of said columns of gate conductors; and gating means selectively connecting said amplifier means to the other end of said one of said columns of gate conductors so as to form a superconductive circuit in which persistent current circulates through said one of said columns, said gating means and said amplifier means.

2. The data storage system of claim 1 including switching means coupled to each of said rows of control conductors and columns of gate conductors respectively for selectively energizing individual ones of said rows of control conductors and columns of gate conductors, respectively.

3. The data storage system of claim 1 wherein said cryogenic amplifier means comprises a plurality of cryogenic amplifiers, each amplifier connected to one end of a separate one of said columns, respectively, and wherein said gating means comprises a plurality of gate conductors selectively connecting each of said amplifiers respectively, to the other end of said one of said columns, respectively, so as to form superconductive loops, respectively, in which persistent current circulates through the column, the gate and the amplifier in each respective superconductive loop.

4. The data storage system of claim 2 wherein said cryogenic amplifier means comprises a plurality of cryogenic amplifiers, each amplifier connected to one end of a separate one of said columns, respectively, and wherein said gating means comprises a plurality of gate conductors selectively connecting each of said amplifiers, respectively, to the other end of said one of said columns, respectively, so as to form superconductive loops, respectively, in which persistent current circulates through the column, the gate and the amplifier in each respective superconductive loop.

5. The data storage system of claim 1 wherein said gating means selectively connects said amplifier means to only one of said columns of gate conductors at a time.

6. The data storage system of claim 1 wherein said cryogenic amplifier means includes inductive input impedance.

7. The data storage system of claim 1 wherein said means for maintaining a persistent circulating current in each cell comprises a continuously superconducting element connected in shunt with said gate conductor.

8. The data storage system of claim 3 wherein each of said cryogenic amplifiers includes inductive input impedance.

9. The data storage system of claim 4 wherein each of said cryogenic amplifiers includes inductive input impedance.

10. The data storage system of claim 1 including means coupled to said gating means for selectively energizing individual ones of said columns of gate conductors, and switching means coupled to each of said rows of control conductors for selectively energizing individual ones of said rows of control conductors.

11. A data storage system comprising: a matrix of superconductive memory cells arranged in rows and columns, each cell including a first unbypassed conductor, a second unbypassed conductor directed substantially normal to said first conductor, and means coupled to said first and second conductors for maintaining a persistent circulating current in said each cell; means connecting each of the second conductors in each of the respective rows of cells in series; means connecting each of the first conductors in each of the respective columns of cells in series; cryogenic amplifier means continuously permitting current passage therethrough, said amplifier means being connected to one end of one of said columns of first conductors; and gating means selectively connecting said amplifier means to the other end of said one of said columns of first conductors so as to form a superconductive circuit in which persistent current circulates through said one of said columns, said gating means and said amplifier means.

12. The data storage system of claim 11 wherein said means for maintaining a persistent circulating current in each cell comprises a tin film underlying said first and second conductorss.

13. A data storage system comprising: a matrix of superconductive memory cells arranged in rows and columns, each cell including a first conductor and a second conductor directed substantially normal to said first conductor; means in each column connecting said first conductor of each cell in said each column directly to the first conductor of the adjacent cell in said column; first superconductive means electrically coupled to said first conductor of each cell in said matrix at least at either end thereof for maintaining a persistent circulating current in each cell of said matrix; and second superconductive means electrically coupled to said each column at each end thereof to form a persistent superconducting circuit therewith.

14. The data storage system of claim 13 wherein said second superconductive means includes gating means selectively closing said persistent superconducting circuit.

15. The data storage system of claim 11 wherein said matrix comprises a unitary continuous film matrix.

References Cited

UNITED STATES PATENTS

| | | | |
|---|---|---|---|
| 3,356,960 | 12/1967 | Edwards | 307—306 X |
| 3,399,388 | 8/1968 | Richards | 340—173.1 |
| 3,452,333 | 6/1969 | Ahrons | 340—173.1 |
| 3,156,902 | 11/1964 | Mann | 340—173.1 |
| 3,181,126 | 4/1965 | Green | 340—173.1 |
| 3,238,512 | 3/1966 | Alphonse | 340—173.1 |
| 3,264,617 | 8/1966 | Feissel | 340—173.1 |
| 3,271,585 | 9/1966 | Crowe | 340—173.1 X |
| 3,302,188 | 1/1967 | Miller | 340—173.1 |
| 3,376,560 | 4/1968 | Zylbersztejn | 340—173.1 |
| 3,381,283 | 4/1968 | Gyorgy | 340—173.1 X |
| 3,394,317 | 7/1968 | Giaever | 307—277 X |
| 3,402,400 | 9/1968 | Sass | 340—173.1 |

TERRELL W. FEARS, Primary Examiner

U.S. Cl. X.R.

340—166